US012106648B2

(12) United States Patent
Tav et al.

(10) Patent No.: US 12,106,648 B2
(45) Date of Patent: *Oct. 1, 2024

(54) INTRUSION MOVEMENT PREDICTION

(71) Applicant: International Business Machines Corporation, Armonk, NY (US)

(72) Inventors: Doga Tav, Fredericton (CA); Cesar Augusto Rodriguez Bravo, Alajuela (CR); Richard James McCarty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,637

(22) Filed: Sep. 6, 2023

(65) Prior Publication Data

US 2023/0419803 A1 Dec. 28, 2023

Related U.S. Application Data

(63) Continuation of application No. 17/660,662, filed on Apr. 26, 2022, now Pat. No. 11,790,744.

(51) Int. Cl.
*G08B 13/20* (2006.01)

(52) U.S. Cl.
CPC .................................... *G08B 13/20* (2013.01)

(58) Field of Classification Search
CPC ....... F24F 11/32; F24F 2221/44; Y04S 40/20; G06F 21/88
See application file for complete search history.

(56) References Cited

U.S. PATENT DOCUMENTS

| | | | |
|---|---|---|---|
| 8,090,817 | B2 | 1/2012 | Fowler |
| 8,892,495 | B2 | 11/2014 | Hoffberg |
| 8,938,367 | B2 | 1/2015 | Patel |
| 10,193,695 | B1 | 1/2019 | Endress |
| 10,462,184 | B1 | 10/2019 | Gu |
| 10,506,411 | B1 | 12/2019 | Jacob |

(Continued)

FOREIGN PATENT DOCUMENTS

| | | | |
|---|---|---|---|
| CN | 205050281 | U | 2/2016 |
| GB | 2528142 | A | 1/2016 |

(Continued)

OTHER PUBLICATIONS

Author Unknown, "Air Proximity Sensor," O'Keefe Controls Co., 1993, http://www.okcc.com/pdf/airproximity.pdf, 3 pages.

(Continued)

*Primary Examiner* — Joseph H Feild
*Assistant Examiner* — Sharmin Akhter
(74) *Attorney, Agent, or Firm* — Michael O'Keefe

(57) ABSTRACT

According to one embodiment, a method, computer system, and computer program product for intrusion movement prediction is provided. The embodiment may include receiving environmental sensor data corresponding to a monitored space as captured by a plurality of sensors affixed to an airflow component. The embodiment may also include generating a three-dimensional model of the monitored space using the received environmental data. The method may further include, in response to determining a disturbance is present in the three-dimensional model, performing a security action.

12 Claims, 6 Drawing Sheets

(56) References Cited

U.S. PATENT DOCUMENTS

| | | | | |
|---|---|---|---|---|
| 10,628,961 | B2 | 4/2020 | Sundaresan | |
| 2010/0271394 | A1 | 10/2010 | Howard | |
| 2014/0375453 | A1 | 12/2014 | Chamoux | |
| 2015/0317418 | A1 * | 11/2015 | Sankarapandian | G06F 30/20 703/1 |
| 2019/0088098 | A1 | 3/2019 | Gangumalla | |
| 2021/0248233 | A1 * | 8/2021 | Manikantan Shila | G01R 21/007 |
| 2022/0003442 | A1 | 1/2022 | Tackabury | |
| 2022/0003449 | A1 | 1/2022 | Tackabury | |
| 2022/0109697 | A1 | 4/2022 | Ritmanich | |
| 2022/0397586 | A1 | 12/2022 | Tav | |
| 2023/0029568 | A1 | 2/2023 | Xiaoli | |

FOREIGN PATENT DOCUMENTS

| | | | |
|---|---|---|---|
| GB | 2554153 | A | 3/2018 |
| JP | 2004334484 | A | 11/2004 |
| KR | 20130052262 | A | 5/2013 |
| KR | 20200091108 | A | 7/2020 |
| WO | 2015074685 | A1 | 5/2015 |

OTHER PUBLICATIONS

Disclosed Anonymously, “A means to detect sensor data false injection attack,” IP.com, IP.com No. IPCOM000257224D, IP.com Publication Date: Jan. 23, 2019, 7 pages.

Disclosed Anonymously, “Digital Twin Based HVAC Contamination Control,” IP.com, IP.com No. IPCOM000263224D, IP.com Publication Date: Aug. 7, 2020, 5 pages.

Disclosed Anonymously, “Dynamic Wi-Fi Intrusion Detection and Ameliorative Action Strategy,” IP.com, IP.com No. IPCOM000258079D, IP.com Publication Date: Apr. 5, 2019, 8 pages.

Disclosed Anonymously, “Machine Learning Algorithms for Smart Meter Diagnostics,” IP.com, IP.com No. IPCOM000242462D, IP.com Publication Date: Jul. 16, 2015, 53 pages.

Gaudreau et al., “Physical Security Best Practices for the Protection of Risk-Significant Radioactive Material,” U.S. NRC, NUREG-2166, May 2014, https://www.nrc.gov/docs/ML1415/ML14150A382.pdf, 171 pages.

Lazaridis, “Long Range (10mt) IR Beam Break Detector,” PCB Heaven, Accessed: Feb. 17, 2022, https://pcbheaven.com/circuitpages/Long_Range_IR_Beam_Break_Detector/?p=11, 28 pages.

Nathanrooy, “aerodynamic-shape-optimization ,” GitHub, 2022, Accessed: Feb. 17, 2022, https://github.com/nathanrooy/aerodynamic-shape-optimization, 2 pages.

Office of Nuclear Security and Incident Response, “Intrusion Detection Systems and Subsystems,” U.S. NRC, NUREG-1959, Published Mar. 2011, https://www.nrc.gov/docs/ML1111/ML11112A009.pdf, 217 pages.

Patel et al., “Detecting Human Movement by Differential Air Pressure Sensing in HVAC System Ductwork: an Exploration in Infrastructure Mediated Sensing,” ResearchGate, Conference Paper, May 2008, https://www.researchgate.netpublication/225206836_Detecting_Human_Movement_by_Differential_Air_Pressure_Sensing_in_HVAC_System_Ductwork_An_Exploration_in_Infrastructure_Mediated_Sensing, 19 pages.

Tav et al., “Intrusion Movement Prediction”, US IBM U.S. Appl. No. 17/660,662, filed Apr. 26, 2022, 34 Pages.

Zhao et al., “Drone Proximity Detection via Air Disturbance Analysis,” Fordham University, DigitalResearch@Fordham, Spring Apr. 2020, https://research.library.fordham.edu/cgi/viewcontent.cgi?article=1078&context=frcv_facultypubs, 10 pages.

* cited by examiner

INTRUSION MOVEMENT PREDICTION

BACKGROUND

The present invention relates generally to the field of computing, and more particularly to intrusion detection systems.

Intrusion detection systems, or security systems, relates to a broad field of technology capable of identifying the presence of an individual within a monitored area and, at times, providing a notification of the presence of the individual. Typically, intrusion detection systems monitor preconfigured areas with various sensors, such as cameras, video recorders, motion detectors, thermal imaging, door/window contacts, glassbreak detectors, manual hold up switches, shock detectors, smoke sensors, magnetic contacts, and bean sensors.

Some intrusion detection systems allow for varying forms of detection notification upon identifying an intruder. For example, a general alarm may be broadcast upon the identification of an intruder. Additionally, the notification may be a silent alarm, such as a security system monitoring for movement in a business after operating hours have ceased.

When transmitting the notification, the intrusion detection system may notify one or more interested parties based on preconfigured settings for the monitored environment. For example, a home security system may notify the homeowner through a push notification or a general alarm. Similarly, a business security system may notify an on-site security staff member and a local law enforcement department.

SUMMARY

According to one embodiment, a method, computer system, and computer program product for intrusion movement prediction is provided. The embodiment may include receiving environmental sensor data corresponding to a monitored space as captured by a plurality of sensors affixed to an airflow component. The embodiment may also include generating a three-dimensional model of the monitored space using the received environmental data. The method may further include, in response to determining a disturbance is present in the three-dimensional model, performing a security action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
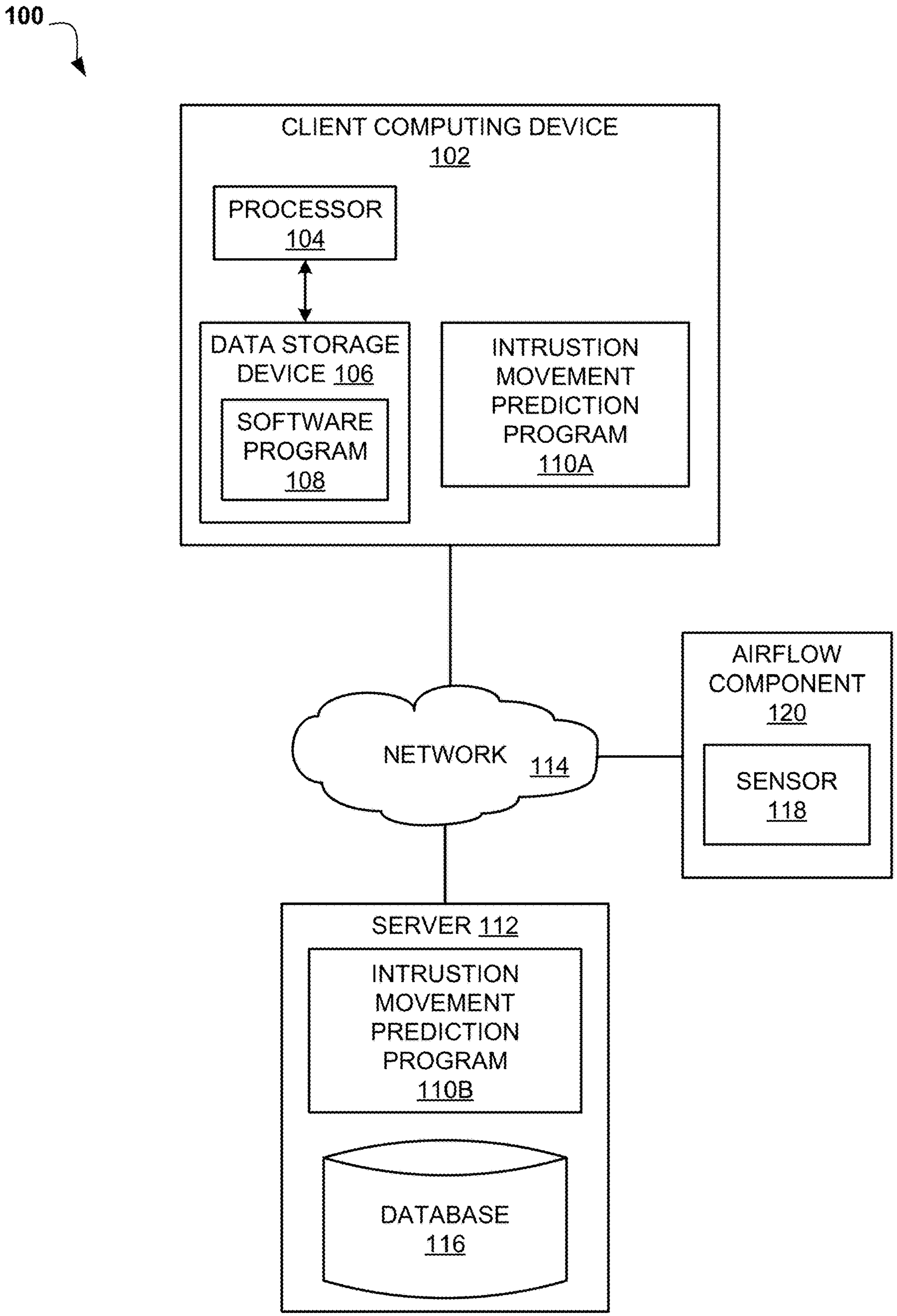
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to intrusion detection systems. The following described exemplary embodiments provide a system, method, and program product to, among other things, identify the presence of an individual or entity within a monitored space through detected changes in airflow. Therefore, the present embodiment has the capacity to improve the technical field of intrusion detection systems by allowing a dynamic system of intrusion detection that can be seamlessly integrated and complemented with other intrusion detection systems (e.g., security cameras).

As previously described, Industry 4.0, also referred to as the fourth industrial revolution, relates to the trend of emergent technologies that connect various entities together through communication networks. Characterized by the digital transformation of the industries encompassing and surrounding manufacturing and production, Industry 4.0 includes, but is not limited to, the fields of autonomous machines, advanced robotics, big data and analytics, the Internet of Things (IoT), digital ubiquity, cloud infrastructures, smart factories, machine learning, artificial technology, and cyber-physical systems.

Intrusion detection systems, or security systems, relates to a broad field of technology capable of identifying the presence of an individual within a monitored area and, at times, providing a notification of the presence of the individual. Typically, intrusion detection systems monitor preconfigured areas with various sensors, such as cameras, video recorders, motion detectors, thermal imaging, door/window contacts, glassbreak detectors, manual hold up switches, shock detectors, smoke sensors, magnetic contacts, and bean sensors.

Some intrusion detection systems allow for varying forms of detection notification upon identifying an intruder. For example, a general alarm may be broadcast upon the identification of an intruder. Additionally, the notification may be a silent alarm, such as a security system monitoring for movement in a business after operating hours have ceased.

When transmitting the notification, the intrusion detection system may notify one or more interested parties based on preconfigured settings for the monitored environment. For example, a home security system may notify the homeowner through a push notification or a general alarm. Similarly, a business security system may notify an on-site security staff member and a local law enforcement department.

One of the main components of industrial centers, such as data centers, is a comprehensive ventilation network, such as a heating, ventilation, and air conditioning (HVAC) system. Even after the occurrence of a disaster, airflow is usually maintained as ventilation is an integral system to operation. For example, in a data center, air conditioning is a critical system necessary for continuous operation servers. However, other systems may be temporarily offline due to the strict power needs of other vital resources in light of the available electric supply. For example, some security mechanisms, such as camera system and other security sensors, may be offline during a power disruption. As such, it may be advantageous to, among other things, utilize an intrusion detection system that is integrated with a ventilation system in order to maintain physical security controls even in the event of a power loss event.

According to at least one embodiment, identification of an intruder's presence may be detected through changes in the amount of airflow throughout a contained environment. Typically, a baseline environmental airflow may fall within a tolerance range dependent upon characteristics of the monitored space, such as size and r-values of exterior walls in relation to exterior temperature. Through a strategically positioned series of devices, changes in airflow in relation to the baseline may be identified. Depending on the number and location of sensors detecting the change, a three-dimensional map may be generated of the activity or affected area. Furthermore, depending on the use case, monitoring may be a dynamic and real-time or a static and on-demand type of activity upon receiving an alert from a communicatively coupled system, such as a centralized security system, or per user request.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify and predict intrusion movement using sensors systematically located near and/or within a ventilation system.

Referring to FIG. 1, an exemplary networked computer environment 100 is depicted, according to at least one embodiment. The networked computer environment 100 may include client computing device 102, a server 112, and one or more sensors 118 interconnected via a communication network 114. According to at least one implementation, the networked computer environment 100 may include a plurality of client computing devices 102, servers 112, and sensors 118, of which only one of each is shown for illustrative brevity. Additionally, in one or more embodiments, the client computing device 102 and server 112 may each individually host an intrusion movement prediction program 110A, 110B. In one or more other embodiments, the intrusion movement prediction program 110A, 110B may be partially hosted on both the client computing device 102 and the server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and the intrusion movement prediction program 110A, receive data from one or more sensors, such as sensor 118, and communicate with the server 112 via the communication network 114, in accordance with one embodiment of the invention. In one or more other embodiments, client computing device 102 may be, for example, a mobile device, a telephone, a personal digital assistant, a netbook, a laptop computer, a tablet computer, a desktop computer, or any type of computing device capable of running a program and accessing a network. As previously described, one client computing device 102 is depicted in FIG. 1 for illustrative purposes, however, any number of client computing devices 102 may be utilized. As will be discussed with reference to FIG. 4, the client computing device 102 may include internal components 402*a* and external components 404*a*, respectively.

The server computer 112 may be a laptop computer, netbook computer, personal computer (PC), a desktop computer, or any programmable electronic device or any network of programmable electronic devices capable of hosting and running the intrusion movement prediction program 110B and a database 116 and communicating with the client computing device 102 via the communication network 114, in accordance with embodiments of the invention. As will be discussed with reference to FIG. 4, the server computer 112 may include internal components 402*b* and external components 404*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, airflow component 120 may be a mechanism that feeds airflow from an established HVAC system through a plurality of outflow ports. Each outflow port may have an integrated regulator valve or flap that enables airflow to be restricted or completely ceased based on preconfigurations or manual dictation. Furthermore, each outflow port may have a corresponding sensor, such as sensor 118, to measure various characteristics of the expelled airflow. In at least one embodiment, airflow component 120 may also be deployed in areas not accessible to physical or digital security devices. For example, airflow component 120 may be installed and utilized in a narrow area of a monitored space not viewable by security cameras, such as a bank vault. Airflow component 120 is discussed in further detail in FIG. 3.

According to the present embodiment, sensor 118 may be incorporated into an HVAC system and/or a monitored space in any manner that allows sensor 118 to take measurement readings of the air movement into, out of, or through the HVAC system and into, out of, and throughout the monitored space. For example, sensors 118 may be positioned at an intake vent or an outflow vent for an HVAC system. In another example, sensors 118 may be positioned throughout a server farm to monitor airflow around various servers and/or critical infrastructure. Additionally, sensor 118 may be capable of taking a variety of measurements from the sampled air, such as airflow speed, temperature, pressure, humidity, or presence of various other entities in the air (e.g., viruses, bacteria, fungi, toxic chemicals, etc.). Due to the nature of the measurements being taken, sensor 118 may be one or more of an anemometer, a thermometer, a barometric pressure device, a humidistat, an electrochemical sensor, a catalytic bead sensor, a low-powered infrared sensor, a photoionization detector, etc. In at least one embodiment, the sensor 118 may be capable of transmitting captured measurement data to the client computing device 102 and/or the server 112 via communication network 114. Furthermore, a single sensor 118 is depicted in FIG. 1 for illustrative purposes, however, any number of sensors 118 may be utilized. The placement of the one or more sensors 118 within or around an HVAC system is explained in further detail in FIG. 3.

According to the present embodiment, the intrusion movement prediction program 110A, 110B may be capable of receiving data related to one or more measurements taken by one or more sensors, such as sensor 118, strategically placed within or around one or more airflow components 120 that are integrated or connected to an HVAC system that relates to airflow and other environmental characteristics within a monitored space. The intrusion movement prediction program 110A, 110B may generate a model of the airflow, or other measured data, within the monitored space that depicts anomalies based on the gathered data. Furthermore, the intrusion movement prediction program 110A, 110B may be capable of instructing one or more other sensors 118, such as a camera associated with a closed circuit television system, to orient toward the anomaly, or disturbance, in the generated model and capture an image or video of the corresponding location in the monitored space where the anomaly is occurring. Similarly, the intrusion movement prediction program 110A, 110B may send a notification to a user, such as an on-duty security officer, informing the user of the detected anomaly and suggesting action be taken. The intrusion movement prediction method is explained in further detail below with respect to FIG. 2.

Figure 2:
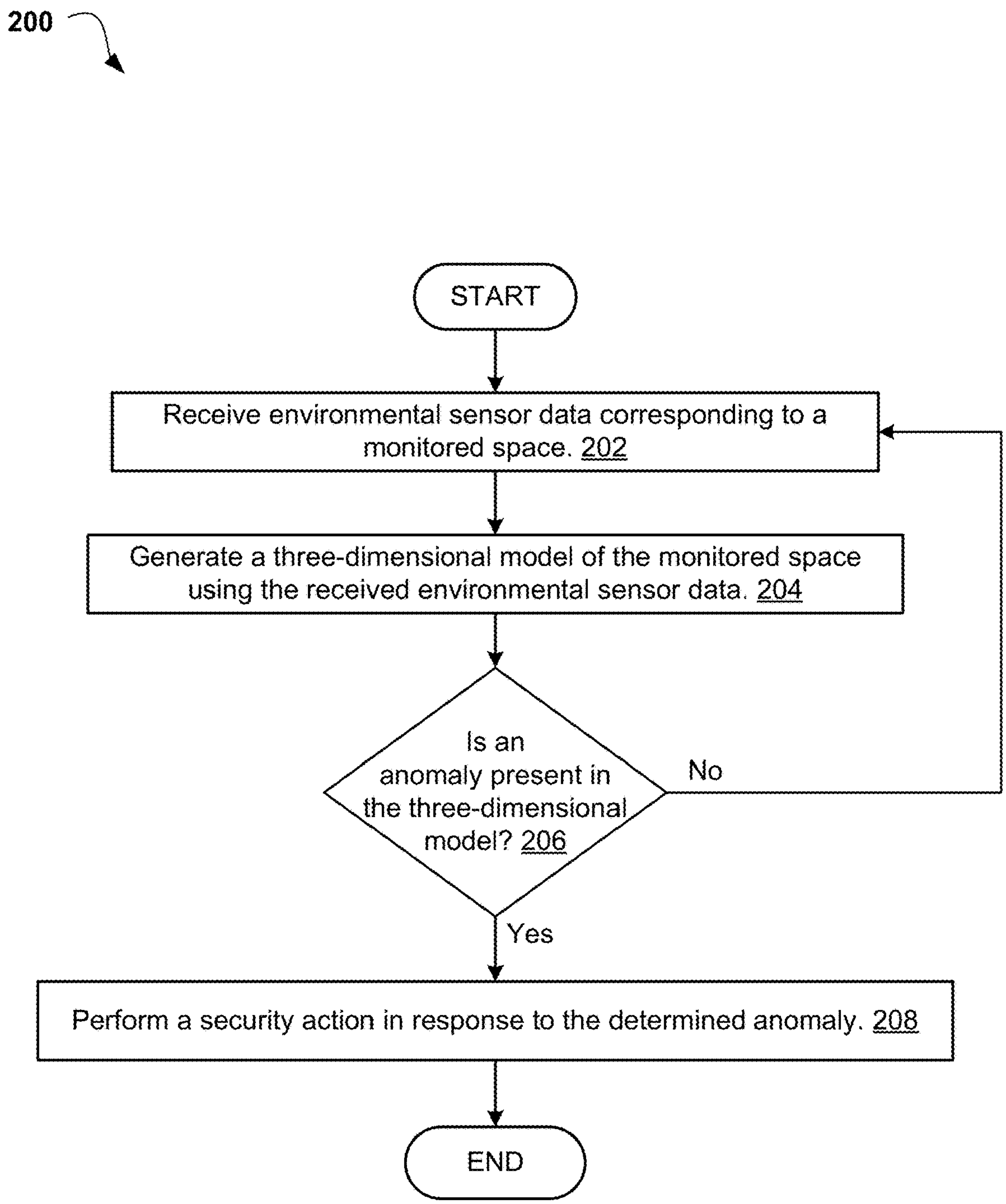
FIG. 2 illustrates an operational flowchart for an intrusion movement prediction process according to at least one embodiment.

Referring now to FIG. 2, an operational flowchart illustrating an intrusion movement prediction process 200 is depicted according to at least one embodiment. At 202, the intrusion movement prediction program 110A, 110B receives environmental sensor data corresponding to a monitored space. As will be described in further detail below in FIG. 3, the intrusion movement prediction program 110A, 110B may utilize an HVAC system with various sensors strategically installed to measure airflow in a given area. Each sensor may be juxtaposed to an air-regulating device, such as a moveable flap, controllable by the intrusion movement prediction program 110A, 110B from a user device, such as client computing device 102 or server 112. When a flap is open opened, the intrusion movement prediction program 110A, 110B may collect environmental data from each sensor 118 deployed around a monitored area. For example, if the intrusion movement prediction program 110A, 110B is monitoring a data center, many anemometers, such as sensor 118, may be placed at various points around an HVAC system capable of capturing air flow data from each point at which an anemometer is placed. In at least one embodiment, the sensors 118 may be placed along an outflow pipe in order to receive data related to obstructions to outflow around the monitored area. In at least one other embodiment, the sensors 118 may be placed along an intake pipe in order to receive data related to obstructions to intake around the monitored area. As previously described, sensor 118 may be capable of taking a variety of measurements from the sampled air, such as airflow speed, temperature, pressure, humidity, or presence of various other entities in the air (e.g., viruses, bacteria, fungi, toxic chemicals, etc.). Due to the nature of the measurements being taken, sensor 118 may be one or more of an anemometer, a thermometer, a barometric pressure device, a humidistat, an electrochemical sensor, a catalytic bead sensor, a low-powered infrared sensor, a photoionization detector, etc.

The location of each sensor deployed around the monitored area may be based on the needs of the user and the monitored space. For example, if a server room is being monitored, the areas around the pull terminals may be deemed critical for monitoring and, therefore, the user can identify that area in a three-dimensional matrix of the deployed sensors 118. In at least one embodiment, a user can reduce the number of deployed sensors 118 from which data is collected based on the complexity and crowdedness of the sensors 118 in the monitored space compared to the monitoring desired by the user.

In at least one embodiment, upon first installation of the sensors 118, the intrusion movement prediction program 110A, 110B may generate a three-dimensional model of the monitored space during a training phase in order to have a comparable baseline of the monitored space free of obstructions and, therefore, anomalous readings. The three-dimensional model may be a graphical representation of the monitored space that depicts the characteristics of the monitored space, such as a walls, fixtures, obstructions, sensor locations, and other features of the space that may affect aspects of airflow and air quality. In at least one embodiment, the number of sensors 118 depicted in the three-dimensional model may be reduced in order to limit the complexity and crowdedness of the model. However, the actual number of deployed sensors 118 throughout the monitored space may be greater than that depicted.

Then, at 204, the intrusion movement prediction program 110A, 110B generates a three-dimensional model for the monitored space using the received environmental sensor data. After receiving the environmental sensor data captured in step 202, the intrusion movement prediction program 110A, 110B may generate a three-dimensional model of the current state of the monitored space. For example, the intrusion movement prediction program 110A, 110B may receive anemometer data of airflow values throughout the monitored space over a given period of time and generate a three-dimensional model of the monitored space the incorporates the captured values at the location in the monitored space from which the value was collected.

Then, at 206, the intrusion movement prediction program 110A, 110B determines whether an anomaly, or disturbance, is present in the three-dimensional model. The intrusion movement prediction program 110A, 110B may determine an anomaly is present when readings within the environmental sensor data for a specific sensor or group of sensors exceed a preconfigured threshold value when compared to baseline values under normal operating conditions as preconfigured during a training phase. If the intrusion movement prediction program 110A, 110B determines an anomaly is present (step 206, "Yes" branch), then the intrusion movement prediction process 200 may proceed to step 208 to perform a security action in response to the determined anomaly. If the intrusion movement prediction program 110A, 110B determines an anomaly is not present (step 206, "No" branch), then the intrusion movement prediction process 200 may return to step 202 to receive environmental sensor data corresponding to the monitored space.

In at least one embodiment, the intrusion movement prediction program 110A, 110B may employ a weighted methodology when determining if an anomaly is present in an area that is deemed as important. For example, if $k>1$ in R denotes the level of depth in the surrounding area to be monitored and $k=2$, the equation may be stated as:

$I=i^{th}$ number of calculations $$W_{ImportantArea}=(m,n)k$$

$$W_{SurroundingAreaXi}=(m-1,n)(k-1)+(m+1,n)(k-1)$$

$$W_{SurroundingAreaYi}=(m,n-1)(k-1)+(m,n+1)(k-1)$$

Where k=2:

TABLE 1

| | | |
|---|---|---|
| (m − 1, n) | (m, n + 1)<br>(m, n)<br>(m, n − 1) | (m + 1, n) |

Where k=3:

TABLE 2

| | | | | |
|---|---|---|---|---|
| (m − 2, n) | (m − 1, n) | (m, n + 2)<br>(m, n + 1)<br>(m, n)<br>(m, n − 1)<br>(m, n − 2) | (m + 1, n) | (m + 2, n) |

In at least one embodiment, R may denote a set of rational numbers, k may be a coefficient in calculating the depth of the surrounding area of the important area, m and n may denote the row n and column n positions in a two-dimensional area. In the above exemplary situation, a two-dimensional area was described that utilized a system of rows m and columns n, however, the intrusion movement prediction program 110A, 110B may also be utilized, and in fact is described in other exemplary embodiments, in a three-dimensional array with m, n, and o coordinates, positions, or areas.

Table 1 and Table 2 illustrate an area defined by the max(k), which depicts a most important area (i.e., (m, n)) and surrounding areas (e.g., (e.g., (m−1, n), (m, n−1), etc.). Whereas each area may vary in size dependent up on the max(k), each area may have a static important area as (m, n). However, since the max(k) varies, the surrounding areas may also vary depended upon the value of k.

Next, at 208, the intrusion movement prediction program 110A, 110B performs a security action in response to the determined anomaly, or disturbance. The security action performed by the intrusion movement prediction program 110A, 110B may include, but is not limited to, sounding an alarm, triggering a silent alarm, locking available mechanisms for entry or exit to the monitored space in which the disturbance is detected, transmitting a notification to a preconfigured individual, or activating one or more security cameras to observe the location where the disturbance is detected.

In at least one embodiment, detected disturbances to areas may trigger varying levels of response. For example, an "immediate action required" alert may be issued when a disturbance is detected in an important area (m, n). An "immediate action required" alert may be issued when a previously undisturbed area is calculated as disturbed in the consequent area disturbance calculation. This results in a movement tracking functionality within the user's defined range and issuing an alert accordingly. Such calculations may also be used to predict the movement of and determine if it is "close" or "approaching" (due to a weighted nature) to the defined "important area". Distinguishably, if a disturbance in the surrounding area (e.g., (m−1, n), (m, n−1), etc.) around the important area is triggered, an "investigate" alert may be issued.

In at least one other embodiment, the alerts issued by the intrusion movement prediction program 110A, 110B may be integrated with other underlying systems, such as in the case of an overall disturbance noticed in the environment. In such a situation, the intrusion movement prediction program 110A, 110B may communicate with the HVAC system to check if the temperature or fan settings have been modified and record, in a log, the action in order to reduce possible false positives.

In yet another embodiment, the intrusion movement prediction program 110A, 110B may enable auxiliary power systems to turn on physical security mechanisms. As previously described, the intrusion movement prediction program 110A, 110B may perform security functions after a disaster has occurred that would otherwise leave security functionality powered off due to power restrictions. Should the intrusion movement prediction program 110A, 110B determine an anomaly or disturbance has occurred, is occurring, or will occur in the monitored area, the intrusion movement prediction program 110A, 110B may transfer power to traditional physical security mechanisms, such as badge readers or door biometric mechanisms, door locks, or cabinet locks, or digital mechanisms, such as lock systems or servers (e.g., log off or disable local log in on computing devices), security cameras, or additional detection systems. In at least one embodiment, the power transfer from critical systems by the intrusion movement prediction program 110A, 110B may only be temporary to active the necessary physical security mechanisms or digital security systems and may return power to any critical systems from which power was borrowed as soon as the processes of the necessary physical security mechanisms or digital security systems are complete. For example, if the intrusion movement prediction program 110A, 110B engages door locks in response to detecting a disturbance, the intrusion movement prediction program 110A, 110B may return power to critical systems immediately upon activating the door locks.

In at least one other embodiment, the intrusion movement prediction program 110A, 110B may execute one or more software calls through web sockets, application programming interfaces (APIs) or other known interfacing technology. For example, upon detecting a disturbance or anomaly in the monitored area, the intrusion movement prediction program 110A, 110B may enable a sandbox environment or enable a keylogger for systems within the monitored area nearby to occurring disturbance. By enabling software calls, the intrusion movement prediction program 110A, 110B may obtain vital information about an intruder causing the disturbance, such as a username obtained through a keylogger when the intruder attempts to log in to a terminal within the monitored area.

Figure 3:
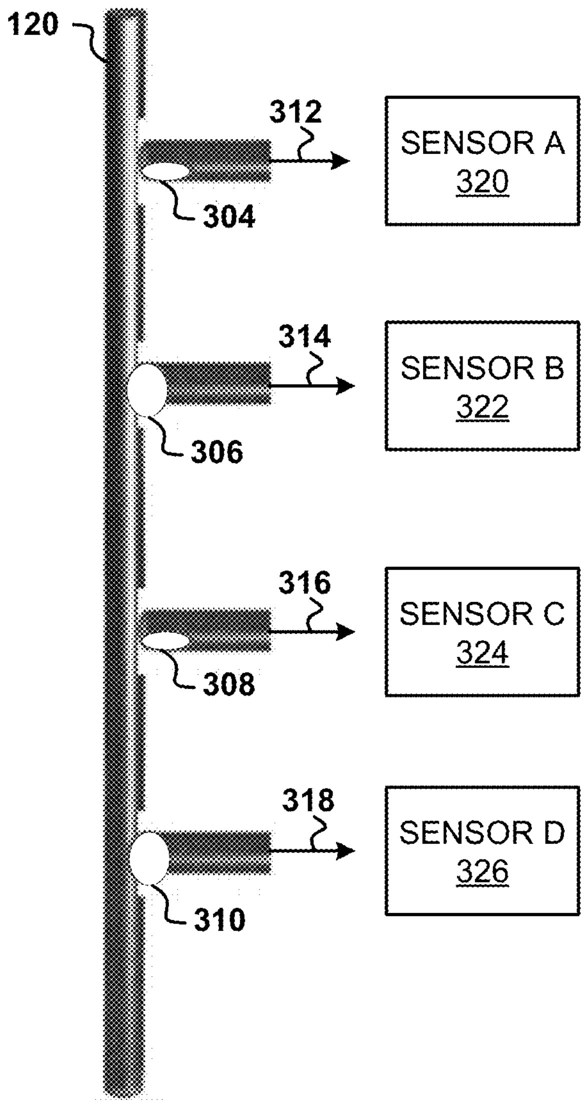
FIG. 3 is an exemplary block diagram of an airflow component according to at least one embodiment.

Referring now to FIG. 3, an exemplary block diagram of an airflow component is depicted according to at least one embodiment. The intrusion movement prediction program 110A, 110B may utilize an airflow component 120, which is capable of integration into an existing HVAC system flow output. The airflow component 120 may be a pillar of varying height with a plurality of outflow points along pillar. For example, as depicted, the airflow component 120 may be eight feet in vertical height with four outflow ports capable of dispensing airflow. Although four outflow ports are depicted, any number of outflow ports may be utilized. Furthermore, each outflow port may have an accompanying airflow regulator flap, such as flaps 304-310, capable of regulating the airflow through each port as controlled by the intrusion movement prediction program 110A, 110B. Each port may also have a sensor, such as sensors A-D 320-326, capable of measuring airflow values through each port. For example, sensors 320-326 may be anemometers that measure airspeed through the respective ports. As depicted, the airflow component 120 may allow airflow 312-318 through each sensor 320-326. The series of deployment of multiple airflow components 120 may enable a three-dimensional rendering of the monitored area as well as airflow readings throughout the environment. Should airflow through one or more airflow ports 312-318 be blocked or otherwise restricted due to an external presence, such as an unauthorized individual in the monitored space, the intrusion movement prediction program 110A, 110B may be capable of detecting the presence due to lower readings from sensors 320-326 and performing preconfigured security actions as described in step 208.

Figure 4:
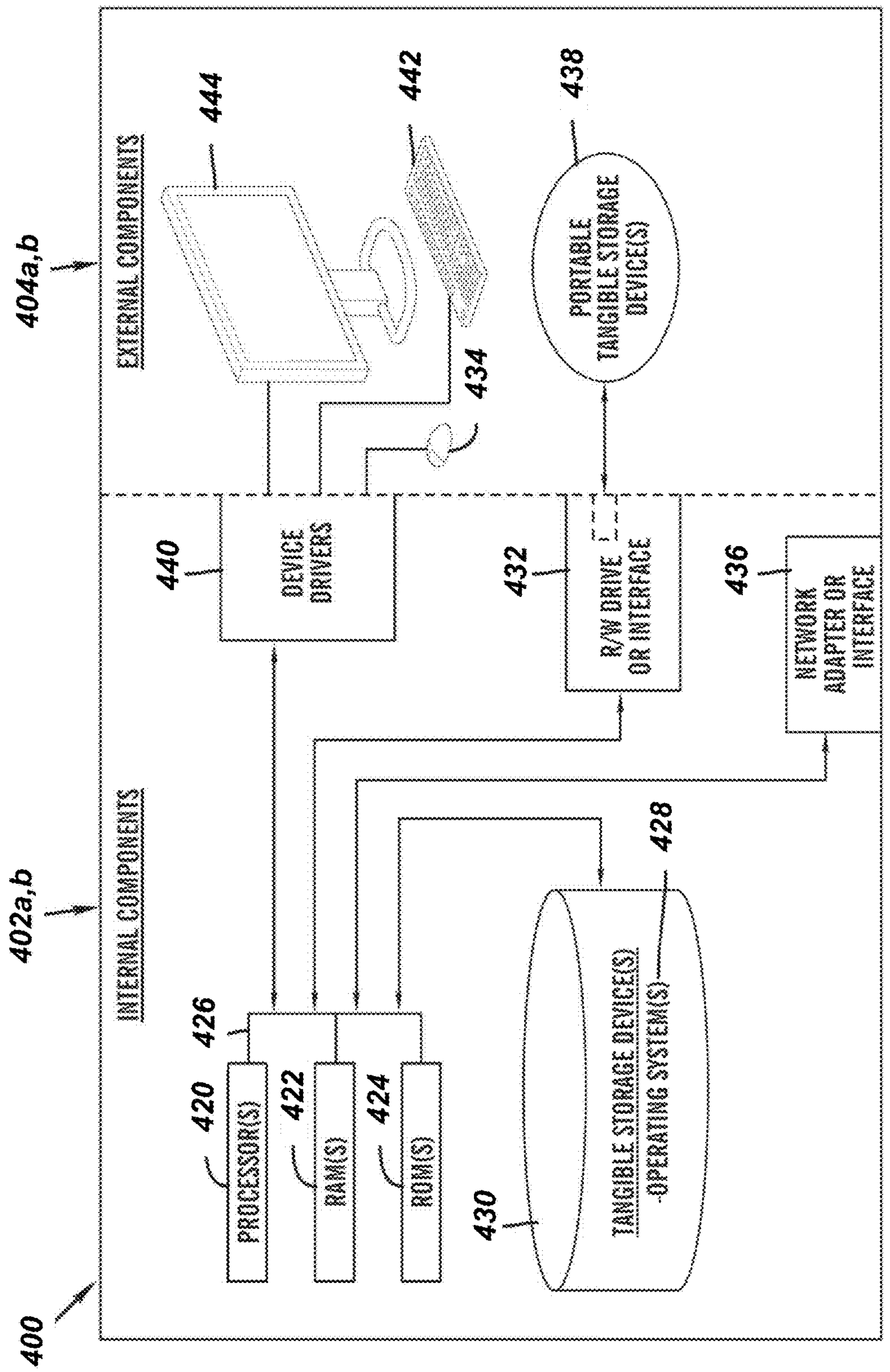
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402*a,b* and external components 404*a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the intrusion movement prediction program 110A in the client computing device 102 and the intrusion movement prediction program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402*a,b* also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the intrusion movement prediction program 110A, 110B, can be stored on one or more of the respective portable computer-readable tangible storage devices 438, read via the respective RAY drive or interface 432, and loaded into the respective hard drive 430.

Each set of internal components 402*a,b* also includes network adapters or interfaces 436 such as a TCP/IP adapter cards, wireless Wi-Fi interface cards, or 3G, 4G, or 5G wireless interface cards or other wired or wireless communication links. The software program 108 and the intrusion movement prediction program 110A in the client computing device 102 and the intrusion movement prediction program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the intrusion movement prediction program 110A in the client computing device 102 and the intrusion movement prediction program 110B in the server 112 are loaded into the respective hard drive 430. The network may comprise copper wires, optical fibers, wireless transmission, routers, firewalls, switches, gateway computers and/or edge servers.

Each of the sets of external components 404*a,b* can include a computer display monitor 444, a keyboard 442, and a computer mouse 434. External components 404*a,b* can also include touch screens, virtual keyboards, touch pads, pointing devices, and other human interface devices. Each of the sets of internal components 402*a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
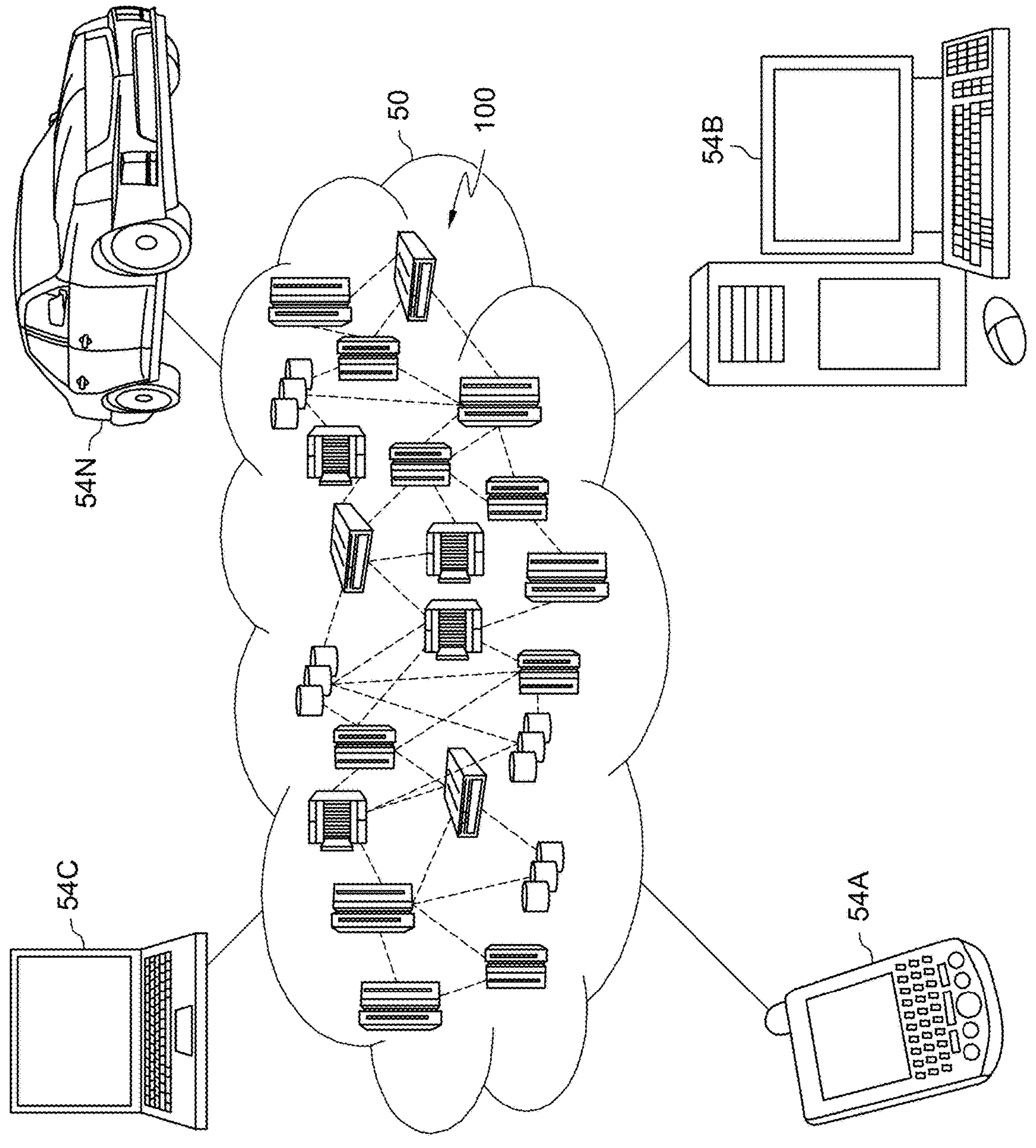
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
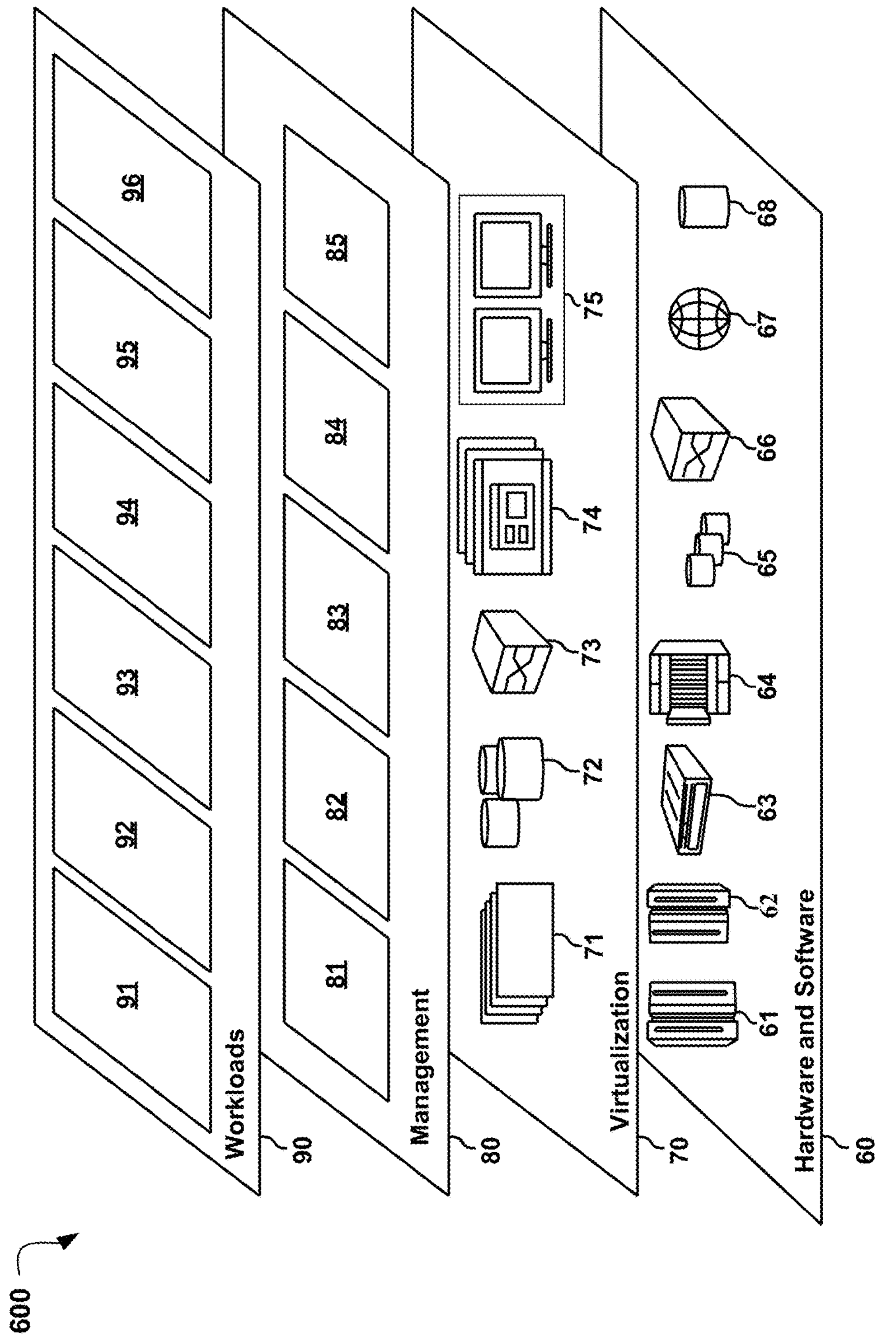
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intrusion movement prediction 96. Intrusion movement prediction may relate to capturing environmental data, such as airflow data, from an HVAC system within a monitored space and identifying anomalies indicative of an intruder in the monitored space based on a three-dimensional model generated with the environmental data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

receiving airflow data corresponding to a monitored space as captured by a plurality of anemometers affixed to an airflow component, wherein the airflow component is a structure, integrated with an HVAC system, with one or more intake or outflow ports, and wherein an anemometer from the plurality of anemometers is affixed to a port of the one or more intake or outflow ports; and generating a three-dimensional model of the monitored space using the received airflow data.

2. The method of claim 1, further comprising:

in response to determining a disturbance is present in the three-dimensional model, performing an action, wherein the disturbance is a change in one or more readings within the airflow data for one or more anemometers within the plurality of anemometers exceeds a preconfigured threshold value when compared to baseline values under normal operating conditions as preconfigured during a training phase.

3. The method of claim 1, wherein the airflow component allows for regulation of air through each outflow port with a regulator, and wherein the regulator is a flap or valve.

4. The method of claim 2, wherein the security action is selected from a group consisting of sounding an alarm, triggering a silent alarm, locking available mechanisms for entry or exit to the monitored space in which the disturbance is detected, transmitting a notification to a preconfigured individual, activating one or more security cameras to observe a location where the disturbance is detected, activating a badge reader, and activating door biometrics mechanisms, activating computing device log-on/log-off mechanism.

5. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving airflow data corresponding to a monitored space as captured by a plurality of anemometers affixed to an airflow component, wherein the airflow component is a structure, integrated with an HVAC system, with one or more intake or outflow ports, and wherein an anemometer from the plurality of anemometers is affixed to a port of the one or more intake or outflow ports; and generating a three-dimensional model of the monitored space using the received airflow data.

6. The computer system of claim 5, further comprising:

in response to determining a disturbance is present in the three-dimensional model, performing an action, wherein the disturbance is a change in one or more readings within the airflow data for one or more anemometers within the plurality of anemometers exceeds a preconfigured threshold value when compared to baseline values under normal operating conditions as preconfigured during a training phase.

7. The computer system of claim 5, wherein the airflow component allows for regulation of air through each outflow port with a regulator, and wherein the regulator is a flap or valve.

8. The computer system of claim 6, wherein the security action is selected from a group consisting of sounding an alarm, triggering a silent alarm, locking available mechanisms for entry or exit to the monitored space in which the disturbance is detected, transmitting a notification to a preconfigured individual, activating one or more security cameras to observe a location where the disturbance is detected, activating a badge reader, and activating door biometrics mechanisms, activating computing device log-on/log-off mechanism.

9. A computer program product, the computer program product comprising:

one or more computer-readable tangible storage medium and program instructions stored on at least one of the one or more tangible storage medium, the program instructions executable by a processor capable of performing a method, the method comprising:

receiving airflow data corresponding to a monitored space as captured by a plurality of anemometers affixed to an airflow component, wherein the airflow component is a structure, integrated with an HVAC system, with one or more intake or outflow ports, and wherein an anemometer from the plurality of anemometers is affixed to a port of the one or more intake or outflow ports; and generating a three-dimensional model of the monitored space using the received airflow data.

10. The computer program product of claim 9, further comprising:

in response to determining a disturbance is present in the three-dimensional model, performing an action, wherein the disturbance is a change in one or more readings within the airflow data for one or more anemometers within the plurality of anemometers exceeds a preconfigured threshold value when compared to baseline values under normal operating conditions as preconfigured during a training phase.

11. The computer program product of claim 9, wherein the airflow component allows for regulation of air through each outflow port with a regulator, and wherein the regulator is a flap or valve.

12. The computer program product of claim 10, wherein the security action is selected from a group consisting of sounding an alarm, triggering a silent alarm, locking available mechanisms for entry or exit to the monitored space in which the disturbance is detected, transmitting a notification to a preconfigured individual, activating one or more security cameras to observe a location where the disturbance is detected, activating a badge reader, and activating door biometrics mechanisms, activating computing device log-on/log-off mechanism.

* * * * *